United States Patent
Chen et al.

(10) Patent No.: US 12,132,973 B1
(45) Date of Patent: Oct. 29, 2024

(54) SYSTEMS AND METHODS FOR PRESERVING CONSISTENT PICTURE QUALITY DURING LIVE STREAMING OF HYBRID CONTENT

(71) Applicant: Adeia Guides Inc., San Jose, CA (US)

(72) Inventors: Tao Chen, Palo Alto, CA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/213,437

(22) Filed: Jun. 23, 2023

(51) Int. Cl.
| | |
|---|---|
| *H04N 21/854* | (2011.01) |
| *G06T 3/02* | (2024.01) |
| *H04N 21/2187* | (2011.01) |
| *H04N 21/233* | (2011.01) |
| *H04N 21/234* | (2011.01) |
| *H04N 21/242* | (2011.01) |
| *H04N 21/81* | (2011.01) |

(52) U.S. Cl.
CPC ............ *H04N 21/854* (2013.01); *G06T 3/02* (2024.01); *H04N 21/2187* (2013.01); *H04N 21/233* (2013.01); *H04N 21/23418* (2013.01); *H04N 21/242* (2013.01); *H04N 21/8146* (2013.01)

(58) Field of Classification Search
CPC ............ H04N 21/854; H04N 21/2187; H04N 21/233; H04N 21/23418; H04N 21/242; H04N 21/8146; G06T 3/02
See application file for complete search history.

(56) References Cited

U.S. PATENT DOCUMENTS 9,503,685 B2    11/2016   Baron et al.

OTHER PUBLICATIONS

Amjoud et al., "Convolutional Neural Networks Backbones for Object Detection," Springer Nature Swizterland AG 2020, A. El Moataz et al. (Eds.):ICISP 2020, LNCS 12119, pp. 282-289 (2020).
Anonymous, "About high dynamic range images," (May 24, 2023) (https://helpx.adobe.com/photoshop/using/high-dynamic-range-images.html) (17 pages).
Bay et al., "SURF: Speeded up robust features," Proc. ECCV, pp. 404-417 (2006).
Kammerl et al., " Temporal Synchronization of Multiple Audio Signals," (5 pages) (undated) (https://storage.googleapis.com/pub-tools-public-publication-data/pdf/42193.pdf).
Narasimha et al., "A Real-Time High Dynamic Range HD Video Camera," Proceedings of the IEEE Conference on Computer Vision and Pattern Recognition (CVPR) Workshops, pp. 35-42 (2015).

(Continued)

*Primary Examiner* — Anthony Bantamoi
(74) *Attorney, Agent, or Firm* — HALEY GUILIANO LLP (57) ABSTRACT

Systems and methods are provided herein for providing consistent picture quality during live or non-live streaming of hybrid content. For example, a camera may capture a first piece of hybrid content depicting a scene. The scene may include one or more real objects (e.g., a first person conducting an interview) and a piece of content (e.g., a stream of a second person being interviewed) being displayed on a screen (e.g., television screen). A system may receive the first piece of hybrid content and the source of the piece of content being displayed within the scene. The system may then insert the source of the piece of content into the first piece of content, replacing the depiction of the piece of content, to generate a second piece of hybrid content. The second piece of hybrid content may then be transmitted to one or more devices.

20 Claims, 8 Drawing Sheets

(56) References Cited

OTHER PUBLICATIONS

Sweet, "High Dynamic Range Photography," Advanced (downloaded Aug. 14, 2023; undated)(https://www.nikonusa.com/en/learn-and-explore/a/tips-and-techniques/high-dynamic-range-photography.html).

Thailappan, "Feature Detection, Description and Matching of Images using OpenCV," Analytics Vidhya (Jun. 14, 2021) (11 pages) (https://www.analyticsvidhya.com/blog/2021/06/feature-detection-description-and-matching-of-images-using-opencv/).

Wang et al., "YOLOv7: Trainable bag-of-freebies sets new state-of-the-art for real-time object detectors," arXiv preprint arXiv:2207.02696 (2022) (15 pages).

Whitehead et al., "Temporal Synchronization of Video Sequences in Theory and in Practice," 2005 Seventh IEEE Workshops on Applications of Computer Vision (WACV/MOTION'05)-vol. 1. vol. 2. IEEE, 2005 (6 pages).

Wikipedia, "Multi-exposure HDR capture," (downloaded Aug. 14, 23) (https://en.wikipedia.org/wiki/Multi-exposure_HDR_capture) (15 pages).

SYSTEMS AND METHODS FOR PRESERVING CONSISTENT PICTURE QUALITY DURING LIVE STREAMING OF HYBRID CONTENT

BACKGROUND

The present disclosure relates to the delivery of content, and in particular to techniques for optimizing the picture quality of the delivered content.

SUMMARY

Streaming content has become increasingly popular, providing a convenient and immersive way to access entertainment, information, and/or educational materials. With an increase in streaming comes an increase in streaming of hybrid content. Hybrid content may refer to content comprising scenes with both real objects and displayed objects. For example, a scene may include a real person giving a seminar, where a graphic is displayed using a computer monitor next to the person. In another example, a scene may include a real person virtually interviewing a second person, where the second person is displayed on a television screen next to the real person. However, traditional streaming technologies often provide less than optimal picture quality of these types of scenes. This stems, in part, from cameras having a lower dynamic range than the human eye. Accordingly, when cameras capture a scene comprising hybrid content, the resulting hybrid content may be overexposed in some areas and/or underexposed in other areas. Traditional capture production in streaming technologies may attempt to combat this problem by manipulating the exposure settings of the cameras. However, adjusting a camera's exposure settings to optimize the brightness of a screen (e.g., computer monitor displaying a graphic) in the scene often results in other portions of the scene being underexposed. Adjusting the camera's exposure settings to optimize the brightness of a real object (e.g., person giving the seminar) in the scene often results in the screen displaying an object being overexposed. In view of these deficiencies, there exists a need for improved systems and methods for streaming hybrid content with consistent picture quality.

Accordingly, techniques are disclosed herein for providing consistent picture quality during live or non-live streaming of hybrid content. For example, a first piece of hybrid content may depict a scene. The scene may include one or more real objects (e.g., a first person conducting an interview) and a piece of content (e.g., a stream of a second person being interviewed) being displayed on a screen (e.g., television screen). The first piece of hybrid content may be captured by one or more cameras and then processed at a first device. The first device may determine the position of the depiction of the television screen in the first piece of hybrid content. For example, the first device may use one or more object detection algorithms, corner detection algorithms, edge detection algorithms, and/or user inputs to identify where the depiction of the television screen is located within the first piece of hybrid content. The first device may also determine a first set of features corresponding to the depiction of the piece of content (e.g., the stream of the second person being interviewed) displayed within the first piece of hybrid content. For example, the first device may perform feature extraction on the depiction of the stream of the second person being interviewed that is displayed on the television screen within the first piece of hybrid content to determine the first set of features.

The first device may also receive a source video corresponding to the piece of content depicted in the first piece of hybrid content. For example, the source video of the stream of the second person being interviewed may be transmitted to the first device and may also be transmitted to the television screen depicted in the first piece of hybrid content. The first device may determine a second set of features corresponding to the received source video. For example, the first device may perform feature extraction on the source video of the stream of the second person being interviewed to determine the second set of features. The first device may then determine a geometric transformation (e.g., affine transformation) using the first set of features and the second set of features. The first device may then modify the source video using the determined geometric transformation. In some embodiments, the features of the modified source video match the first set of features corresponding to the depiction of the stream of the second person being interviewed within the first piece of hybrid content.

The first device may then synchronize the modified source video with the depiction of the piece of content displayed within the first piece of hybrid content. For example, the first device may change the playback speed, frame rate, and/or playback point of the modified source video to match the playback speed, frame rate, and/or playback point of the depiction of the stream of the second person being interviewed within the first piece of hybrid content. The first device may synchronize the modified piece of content with the depiction of the piece of content using video synchronization and/or audio synchronization. For example, the first device may match one or more frames from the depiction of the stream of the second person being interviewed with one or more frames from the modified source video. In another example, the first device may match a portion of a first audio signal associated with the depiction of the stream of the second person being interviewed with a portion of a second audio signal associated with the modified source video.

The first device may generate a second piece of hybrid content by combining the modified source video with the first piece of hybrid content, wherein the modified video is synchronized with the depiction of the stream of the second person being interviewed within the first piece of hybrid content. In some embodiments, the first device generates the second piece of hybrid content by replacing the depiction of the stream of the second person being interviewed within the first piece of hybrid content with the modified source video. For example, the first device may remove any data (e.g., depiction of the stream of the second person being interviewed) located within the determined position of the depiction of the screen (e.g., television screen) in the first piece of hybrid content, and insert the modified source video to generate the second piece of hybrid content. Accordingly, the camera settings can be optimized for real objects (e.g., the first person conducting the interview) when capturing the scene. Optimizing the camera settings for real objects (e.g., the first person conducting the interview) may result in a depiction of a piece of content (e.g., the stream of the second person being interviewed) having a poor picture quality in a first piece of hybrid content generated from the captured scene. However, replacing the poor picture quality version of the depiction of the piece of content with the modified source video allows one or more devices to generate a second piece of hybrid content with a higher picture quality depiction of the piece of content and the real objects.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
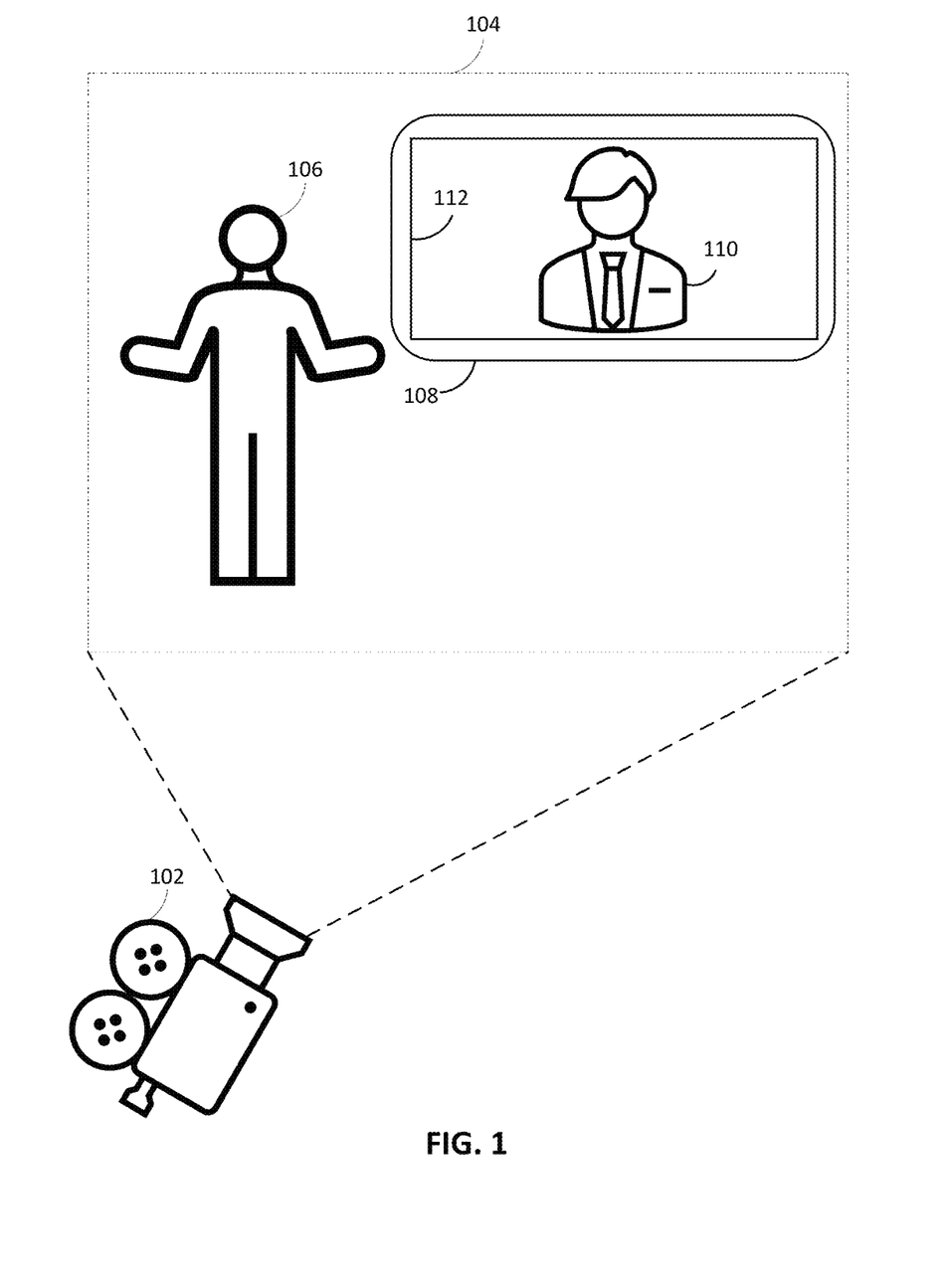
FIG. 1 shows an illustrative diagram of a system for providing consistent picture quality during streaming of hybrid content, in accordance with embodiments of the disclosure.

FIG. 1 shows an illustrative diagram of a system 100 for providing consistent picture quality during streaming of hybrid content, in accordance with embodiments of the disclosure. In some embodiments, the system 100 comprises a first device 102 capturing a first scene 104. The first device 102 may be any device capable of capturing image data related to a scene. For example, the first device 102 may be a digital single-lens reflex (DSLR) camera, point-and-shoot camera, bridge camera, and/or a camera phone. In some embodiments, the first scene 104 comprises one or more real objects (e.g., people, furniture, devices, etc.) such as a first person 106 and a second device 108. The first scene 104 may also include a first piece of content 110 displayed by the second device 108. For example, the first person 106 may be conducting an interview with a second person at a different location, and the second device 108 may receive a stream of the second person at the different location and display the stream using a display 112. In another example, the first person 106 may be giving a presentation, and the second device 108 may receive a graphic and display the graphic using the display 112.

In some embodiments, the first device 102 transmits the captured image data associated with the first scene 104 to one or more other devices (e.g., a server, video analytic device, video processor unit, etc.). In some embodiments, the first device 102 stores and/or processes the captured image data of the first scene 104.

Figure 2:
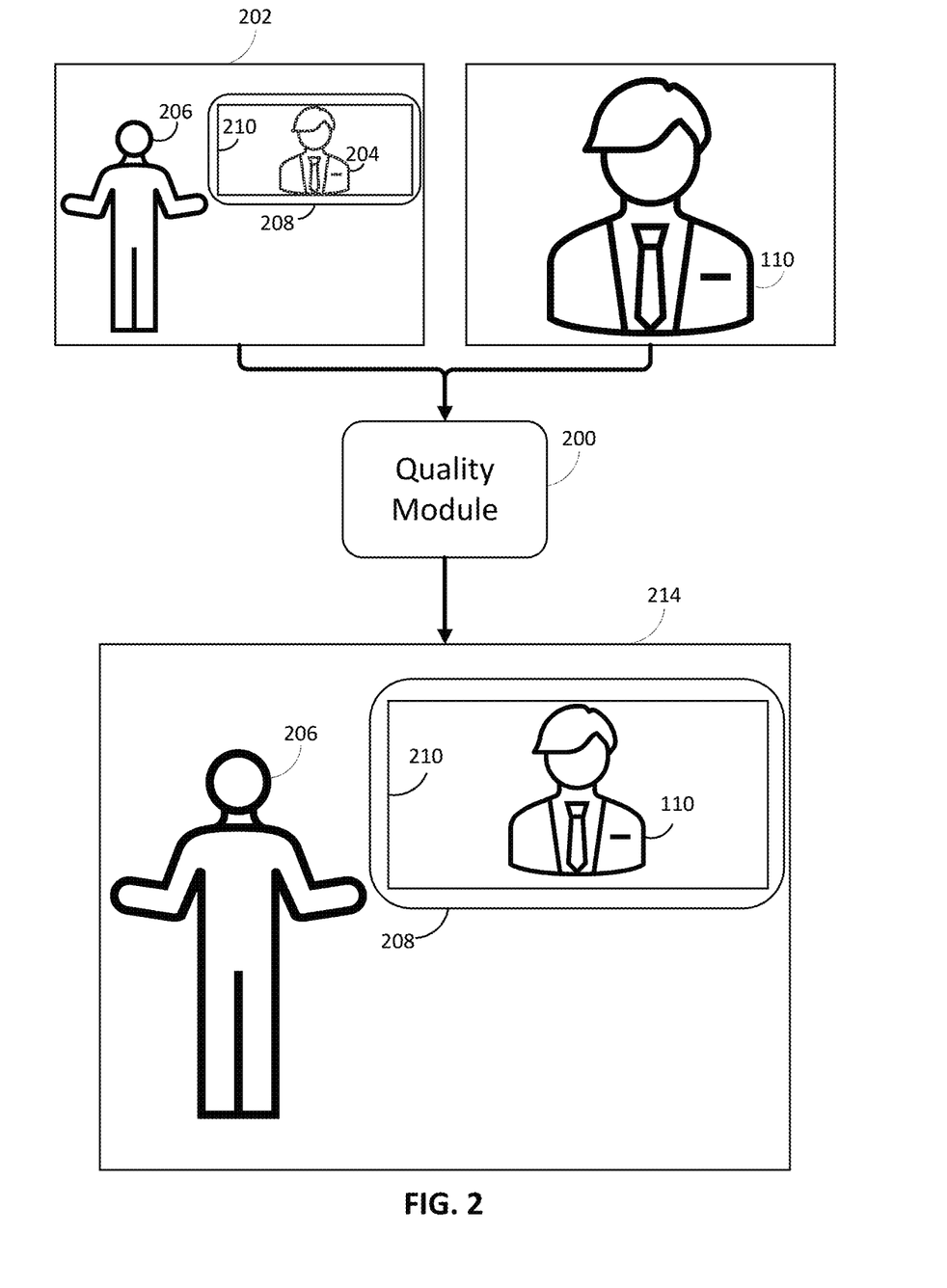
FIG. 2 shows a block diagram of an illustrative process for providing consistent picture quality during streaming of hybrid content, in accordance with embodiments of the disclosure.

FIG. 2 shows a block diagram of an illustrative process for providing consistent picture quality during streaming of hybrid content, in accordance with embodiments of the disclosure. FIG. 2 displays a quality module 200 receiving the first piece of content 110 and a first piece of hybrid content 202. In some embodiments, the quality module 200 is incorporated into a user equipment device (e.g., first device 102, video analytic device, smartphone, etc.), a server, and/or any similar such device. In some embodiments, one or more functions of the quality module 202 are distributed across multiple devices.

In some embodiments, the quality module 200 is incorporated into the device (e.g., first device 102) that captured the scene depicted in the first piece of hybrid content 202. For example, the first device 102 may capture the first scene 104 and then generate the first piece of hybrid content 202 using the quality module 200. In some embodiments, the quality module 200 is incorporated into an additional device that receives the first piece of hybrid content 202 from the source (e.g., first device 102) that captured the first scene 104.

In some embodiments, the quality module 200 receives the first piece of content 110 from the source of the first piece of content 110. For example, a server may transmit the first source video of the piece of content 110 to the quality module 200 and also transmit the source video of the first piece of content 110 to the second device 108. In some embodiments, the quality module 200 receives the first piece of content 110 from the same device that displayed the first piece of content 110 in the scene depicted in the first piece of hybrid content 202. For example, the second device 108 may display the first piece of content 110 and also transmit the first piece of content 110 to the quality module 200.

The first piece of hybrid content 202 may depict the first scene 104. For example, the first piece of hybrid content 202 may comprise a depiction of the first person 206, a depiction of the second device 208, a depiction of the display 210 of the second device, and a depiction of the first piece of content 204. In some embodiments, the quality module 200 uses one or more techniques to determine a position corresponding to the depiction of the first piece of content 204 within the first piece of hybrid content 202. For example, the quality module 200 may use one or more object detection algorithms, corner detection algorithms, edge detection algorithms, and/or user inputs to identify where the depiction of the first piece of content 204 is located within the first piece of hybrid content 202.

In some embodiments, the first piece of content 110 comprises one or more segments. For example, the first piece of content 110 may have a playback length of five minutes comprising five segments, wherein each segment has a playback length of one minute. In another example, the first piece of content 110 may comprise three segments corresponding to the beginning, middle, and end of the first piece of content 110. In some embodiments, one or more frames of the first piece of content 110 correspond to a segment. In some embodiments, the depiction of the first piece of content 204 also comprises one or more segments.

In some embodiments, one or more segments of the first piece of content 110 correspond to one or more segments of the depiction of the first piece of content 204. For example, the first piece of content 110 may have a first plurality of segments spanning an entire length of a video clip (e.g., the first piece of content 110 may be a video clip of a person talking). The depiction of the first piece of content 204 may have a second plurality of segments also spanning the entire length of the video clip. In such an example, the first plurality of segments may correspond to the second plurality of segments because both the first piece of content 110 and the depiction of the first piece of content 204 correspond to the entire length of the video clip.

In another example, the first piece of content 110 may have a first plurality of segments spanning the entire length of the video clip, while the depiction of the first piece of content 204 may have a third plurality of segments spanning a portion of the video clip (e.g., the first piece of hybrid content 202 may display only a portion of the video clip). In such an example, the first playback length comprises the first plurality of segments and the third playback length comprises a third plurality of segments. In some embodiments, only a subset of the first plurality of segments correspond to the third plurality of segments, because only a portion of the video clip was displayed in the first piece of hybrid content 202.

In some embodiments, the quality module 200 compares one or more segments of the depiction of the first piece of content 204 with one or more segments of the first piece of content 110. For example, a first plurality of segments may correspond to the first piece of content 110, and a second plurality of segments may correspond to the depiction of the first piece of content 204. The quality module 200 may determine that a first segment (e.g., frame or frames of a video clip, audio signal, etc.) of the first plurality of segments matches a first segment of the second plurality of segments. In some embodiments, the quality module 200 uses image recognition applications, frequency comparison applications, optical flow estimation, one or more machine learning algorithms and/or similar such methodologies to determine that the first segment of the first plurality of segments matches the first segment of the second plurality of segments.

In some embodiments, the quality module 200 synchronizes the first piece of content 110 with the depiction of the first piece of content 204 after comparing one or more segments of the depiction of the first piece of content 204 with one or more segments of the first piece of content 110. For example, the quality module 200 may modify the first piece of content 110 so that one or more segments corresponding to the modified piece of content 110 match one or more segments of the depiction of the first piece of content 204. In some embodiments, the quality module 200 synchronizes the first piece of content 110 with the depiction of the first piece of content 204 by modifying the playback speed, frame rate, and/or playback point of the first piece of content 110 to match the depiction of the first piece of content 204. For example, the depiction of the first piece of content 204 may have a playback length and playback point corresponding to the last portion (e.g., one or more segments) of a video clip. The quality module 200 may trim the first piece of content 110 to have the same or similar segments as the depiction of the first piece of content 204. Trimming the first piece of content 110 may result in a first modified piece of content having a playback length matching the playback length of the depiction of the first piece of content 204 and a starting playback point matching the starting playback point of the depiction of the first piece of content 204.

In some embodiments, the quality module 200 determines a geometric transformation between the first piece of content 110 and the depiction of the first piece of content 204. In some embodiments, the quality module 200 determines the geometric transformation by comparing one or more features associated with the first piece of content 110 and one or more features associated with the depiction of the first piece of content 204. For example, the quality module 200 may perform feature extraction on the position of the depiction of the first piece of content 204 in the first piece of hybrid content 202 to identify a first set of features associated with the depiction of the first piece of content 204. The quality module 200 may also perform feature extraction on the first piece of content 110 to identify a second set of features associated with the first piece of content 110. The quality module 200 may then perform feature matching using the first set of features and the second set of features to determine a geometric transformation (e.g., affine transformation) between the first piece of content 110 and the depiction of the first piece of content 204.

In some embodiments, the quality module 200 performs feature extraction after synchronizing the first piece of content 110 with the depiction of the first piece of content 204. For example, the quality module 200 may perform feature extraction on the depiction of the first piece of content 204 in the first piece of hybrid content 202 to identify the first set of features. The quality module 200 may also perform feature extraction on the first modified piece of content (e.g., the first piece of content 110 modified to have a playback length matching the playback length of the depiction of the first piece of content 204 and a starting playback point matching the starting playback point of the depiction of the first piece of content 204) to identify a third set of features. The quality module 200 may then perform feature matching using the first set of features and the third set of features to determine a geometric transformation between the first modified piece of content and the depiction of the first piece of content 204.

In some embodiments, synchronizing the first piece of content 110 with the depiction of the first piece of content 204 before determining the geometric transformation results in a more precise geometric transformation. For example, one or more segments (e.g., a first portion of a video clip) of the modified first piece of content may correspond to one or more segments (e.g., the first portion of the video clip) of the depiction of the first piece of content 204. In such an example, the extracted features and/or a subset of the extracted features may be more similar due to the similarities between the corresponding features. The increased similarities between the features may result in fewer estimations when determining the geometric transformation and fewer estimations may result in a more precise geometric transformation.

In some embodiments, synchronizing the first piece of content 110 with the depiction of the first piece of content 204 before determining the geometric transformation results in a reduction in the number of frames that are geometrically transformed. For example, the quality module 200 may trim the first piece of content 110 to have the same or similar segments as the depiction of the first piece of content 204. Trimming the first piece of content 110 may result in a first modified piece of content having a shorter playback length (e.g., matching the playback length of the depiction of the first piece of content 204) than the first piece of content 110. Accordingly, when the quality module 200 applies the geometric transformation to the first modified piece of content 204, fewer frames are transformed compared to if the geometric transformation was applied to the first piece of content 110.

In some embodiments, the quality module 200 modifies the first piece of content 110 using the determined geometric transformation to generate a second modified piece of content. In some embodiments, the features of the second modified piece of content match the first set of features corresponding to the depiction of the first piece of content 204 in the first piece of hybrid content 202. In some embodiments, the quality module 200 generates the second modified piece of content by modifying the first modified piece of content using the determined geometric transformation.

The quality module may generate a second piece of hybrid content 214 by combining the first piece of content 110 with the first piece of hybrid content 202. In some embodiments, the quality module 200 generates the second piece of hybrid content 214 by replacing the depiction of the first piece of content 204 with the first piece of content 110 or a modified version (e.g., first modified piece of content, second modified piece of content, etc.) of the first piece of content 110. For example, the quality module 200 may remove any data (e.g., depiction of the first piece of content 204) located within the position of the depiction of the display 210 in the first piece of hybrid content 202, and insert the first piece of content 110 or a modified version of the first piece of content 110.

When generating the second piece of hybrid content 214, the quality module 200 may use one or more techniques to blend the inserted first piece of content 110 or modified version of the first piece of content 110 with the first piece of hybrid content 202. For example, the quality module 200 may use image blending and/or compositing techniques when merging the first piece of content 110 or modified version of the first piece of content 110 with the first piece of hybrid content 202. In another example, the quality module 200 may use tone mapping and/or color transformations when merging the first piece of content 110 or modified version of the first piece of content 110 with the first piece of hybrid content 202. In another example, the quality module 200 may use one or more video filters when merging the first piece of content 110 or modified version of the first piece of content 110 with the first piece of hybrid content 202.

In some embodiments, combining the first piece of content 110 or modified version of the first piece of content 110 with the first piece of hybrid content 202 allows the capture settings for the device (e.g., first device 102) capturing the first piece of hybrid content 202 to be optimized for real objects (e.g., the first person conducting the interview) when capturing the scene. These settings may result in the depiction of the first piece of content 204 having a poor picture quality in the first piece of hybrid content 202. However, the quality module 200 replaces the poor picture quality version of the depiction of the first piece of content 204 with the first piece of content 110 or the modified version of the first piece of content 110. Accordingly, the second piece of hybrid content 214 comprises appropriate picture quality for the real objects and the first piece of content 110.

Figure 3:
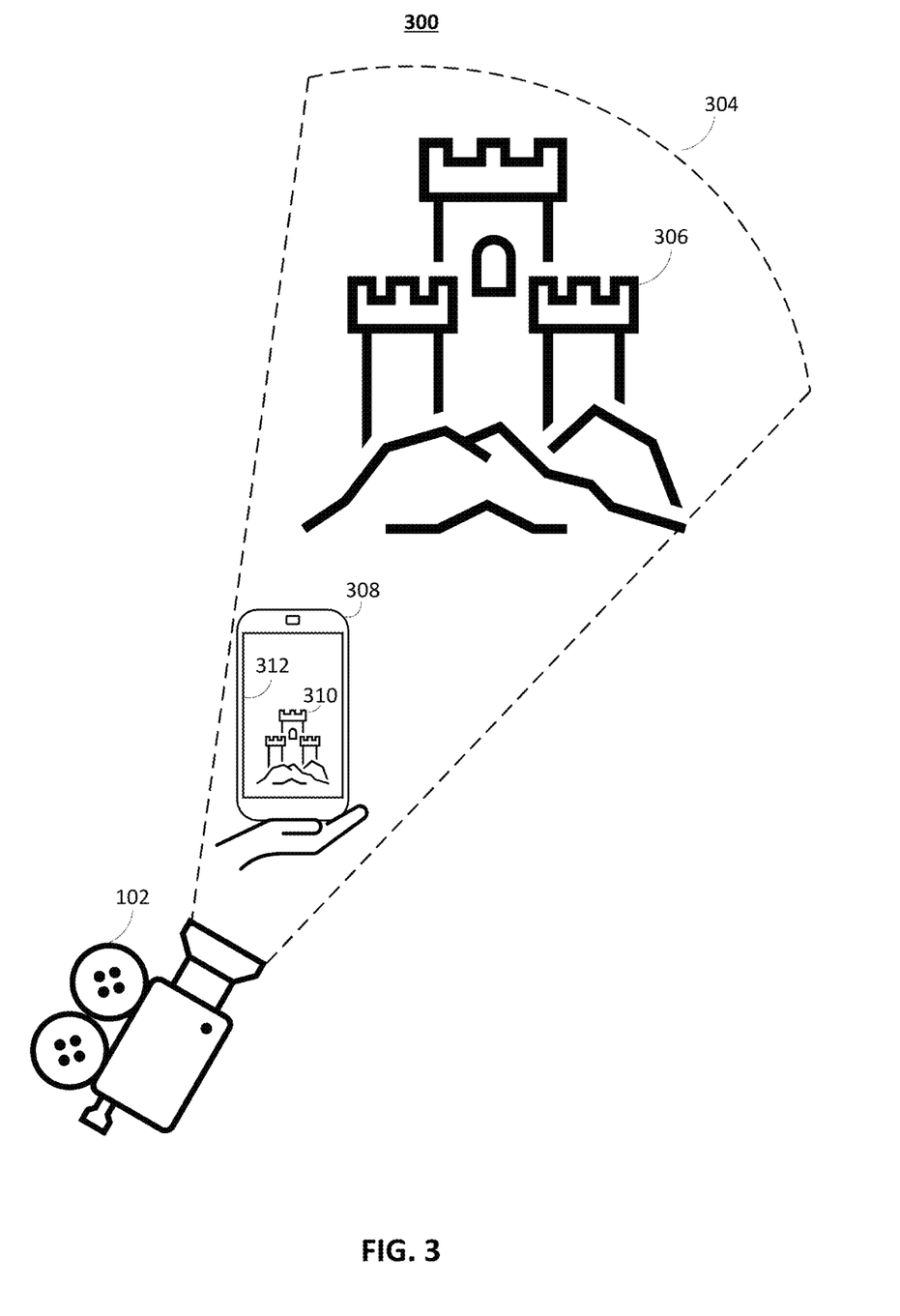
FIG. 3 shows another illustrative diagram of a system for providing consistent picture quality during streaming of hybrid content, in accordance with embodiments of the disclosure.

FIG. 3 shows an illustrative diagram of a system 300 for providing consistent picture quality during streaming of hybrid content, in accordance with embodiments of the disclosure. In some embodiments, the system 300 comprises the first device 102 capturing a second scene 304. In some embodiments, the second scene 304 comprises one or more real objects (e.g., people, furniture, devices, etc.) such as a building 306 and a third device 308. The first scene 304 may also include a second piece of content 310 displayed by the second device 308. For example, a person may be capturing a video of the building 306 using the second device 308 and the second device 308 may display the captured video on a display 312.

In some embodiments, the first device 102 transmits the captured image data associated with the second scene 304 to one or more other devices (e.g., a server, video analytic device, video processor unit, etc.). In some embodiments, the first device 102 stores and/or processes the captured image data of the second scene 304. In some embodiments, the third device 308 also transmits captured image data (e.g., video of the building 306) to the same device that processes the captured image data associated with the first device 102. For example, the first device 102 may transmit the first captured image data of the second scene 304 to a server comprising a quality module (e.g., quality module 200), and the third device 308 may transmit second captured image data to the same server. The quality module may then combine the first captured image data with the second captured image data and/or a modified version of the second captured image data as described above to generate a piece of hybrid content with improved picture quality.

Figure 4A:
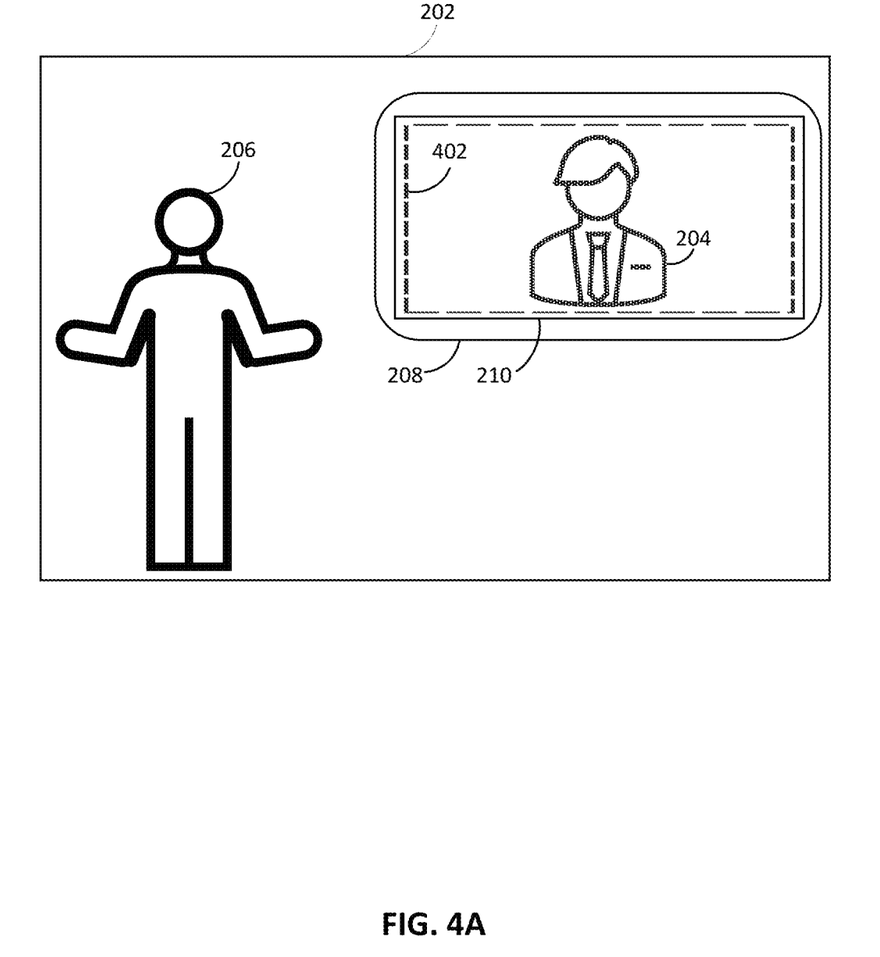
FIGS. 4A and 4B show illustrative diagrams of identifying a depiction of a piece of content, in accordance with embodiments of the disclosure.
Figure 4B:
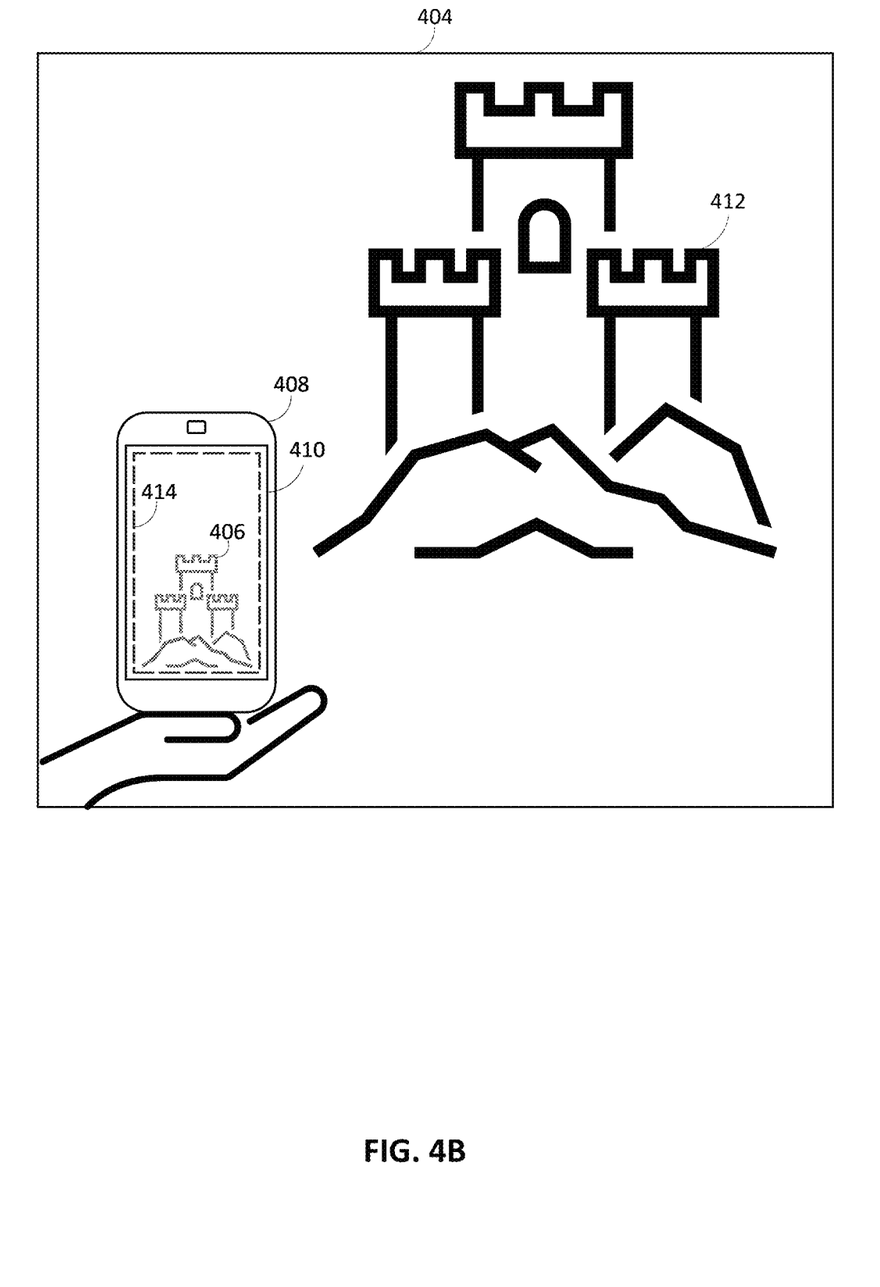

FIGS. 4A and 4B show illustrative diagrams of identifying a depiction of a piece of content, in accordance with embodiments of the disclosure. FIG. 4A displays the first piece of hybrid content 202 comprising the depiction of the first piece of content 204. In some embodiments, the first piece of hybrid content 202 and the first piece of content 110 are received by a quality module (e.g., quality module 200). As described above, the first piece of hybrid content 202 may depict a scene (e.g., the first scene 104). For example, the first piece of hybrid content 202 may comprise a depiction of the first person 206, a depiction of the second device 208, a depiction of the display 210 of the second device, and a depiction of the first piece of content 204. In some embodiments, the quality module 200 uses one or more techniques to determine a first position 402 corresponding to the depiction of the first piece of content 204 within the first piece of hybrid content 202. In some embodiments, the quality module 200 uses one or more object detection algorithms, corner detection algorithms, edge detection algorithms, and/or user inputs to identify the first position 402 corresponding to where the depiction of the first piece of content 204 is located within the first piece of hybrid content 202.

The quality module 200 may determine the first position 402 based on one or more user inputs. For example, the first piece of hybrid content 202 may be displayed on an interactive display, and a user may draw the first position 402 around the depiction of the first piece of content 204. In another example, the first piece of hybrid content 202 may be displayed on an interactive display, and a user may adjust one or more overlayed shapes (e.g., rectangle as shown in FIG. 4A, circle, square, polygon, etc.) to indicate the first position 402 of the depiction of the first piece of content 204. In another example, one or more estimations of the position of the depiction of the first piece of content 204 are displayed for a user, and the user selects and/or modifies one or more of the estimations to indicate the first position 402.

In some embodiments, the quality module 200 determines the first position 402 based on previous positions. For example, the device (e.g., first device 102) that captures the first piece of hybrid content 202 may be in a fixed location (e.g., part of a film set). A second device (e.g., second device 108) that displays the content (e.g., the first piece of content 110) may also be in a fixed location (e.g., part of the film set). In such an example, the quality module 200 may determine the first position 402 of the depiction of the first piece of content 204 within the first piece of hybrid content 202 and store the first position 402 for future use. Accordingly, the quality module 200 may use the stored first position 402 when generating hybrid content in the future to improve processing efficiency.

In some embodiments, the device determines the first position 402 based on different configurations. Configurations may associate locations of one or more devices with positions of depictions of displayed content within a piece of generated content. For example, a first configuration may indicate that when the first device capturing the first piece of hybrid content 202 is at a first location and the second device that displays the first piece of content is at a second location, then the depiction of the first piece of content 204 will be located at the first position 402 within the piece of hybrid content 202. A second configuration may indicate that when the first device capturing the first piece of hybrid content 202 is at a third location and the second device that displays the first piece of content is at the second location, then the depiction of the first piece of content 204 will be located at a second position within the piece of hybrid content 202. A third configuration may indicate that when the first device capturing the first piece of hybrid content 202 is at the first location and the second device that displays the first piece of content is at a fourth location, then the depiction of the first piece of content 204 will be located at a third position within the piece of hybrid content 202. A fourth configuration may indicate that when the first device capturing the first piece of hybrid content 202 is at the third location and the second device that displays the first piece of content is at the fourth location, then the depiction of the first piece of content 204 will be located at a fourth position within the piece of hybrid content 202. In some embodiments, the device determines a configuration based on user input and/or received location information (e.g., the second device that displays the content and/or the first device that captures the hybrid content may transmit location coordinates to the device determining the position).

FIG. 4B displays a third piece of hybrid content 404 comprising a depiction of the second piece of content 406. In some embodiments, the third piece of hybrid content 402 also comprises a depiction of the third device 408, depiction of the display 410 of the second device, and a depiction of the building 412. In some embodiments, the third piece of hybrid content 404 and the second piece of content 310 are received by a quality module (e.g., quality module 200). In some embodiments, the quality module 200 uses one or more techniques to determine a second position 414 corresponding to the depiction of the second piece of content 406 within the third piece of hybrid content 404. In some embodiments, the quality module 200 uses one or more object detection algorithms, corner detection algorithms, edge detection algorithms, and/or user inputs to identify the second position 414 corresponding to where the depiction of the second piece of content 406 is located within the third piece of hybrid content 404.

The quality module 200 may determine the second position 414 based on one or more user inputs. For example, the third piece of hybrid content 404 may be displayed on an interactive display, and a user may draw the second position 414 around the depiction of the second piece of content 406. In another example, the third piece of hybrid content 404 may be displayed on an interactive display, and a user may adjust one or more overlayed shapes (e.g., rectangle as shown in FIG. 4B, circle, square, polygon, etc.) to indicate the second position 414 of the depiction of the second piece of content 406. In another example, one or more estimations of the position of the depiction of the second piece of content 406 are displayed for a user, and the user selects and/or modifies one or more of the estimations to indicate the second position 414. In some embodiments, the quality module 200 determines the second position 414 based on previously determined positions and/or received configurations.

Figure 5:
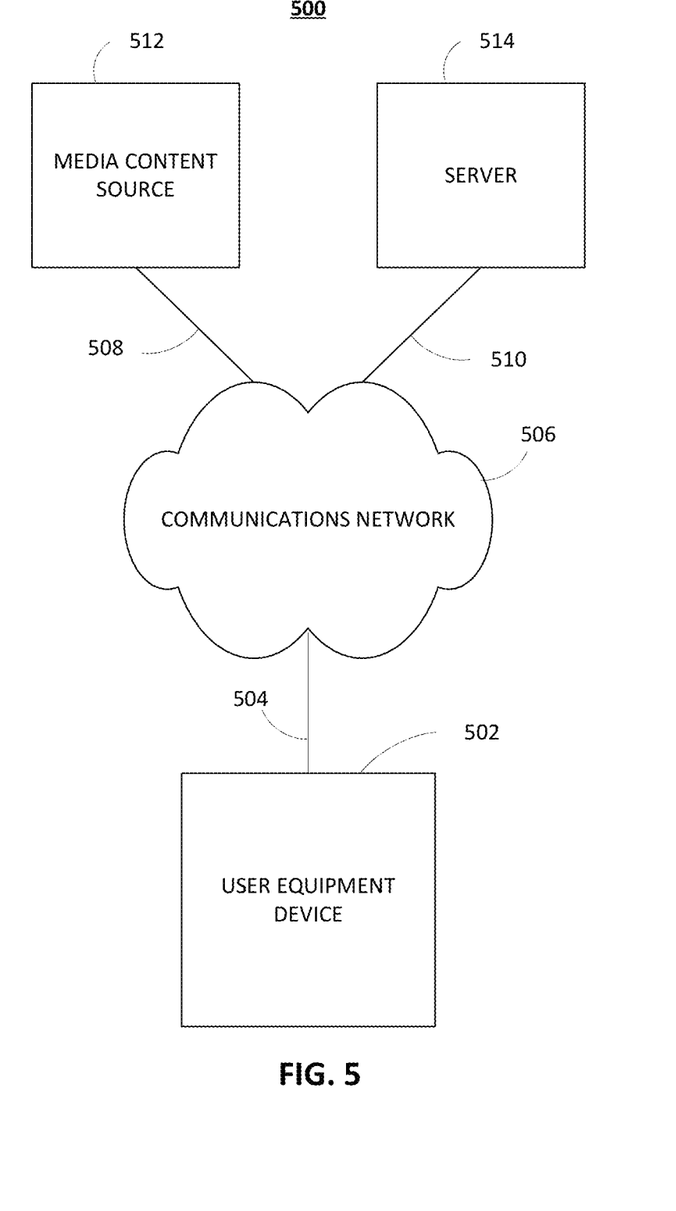
FIG. 5 shows an illustrative block diagram of a media system, in accordance with embodiments of the disclosure.
Figure 6:
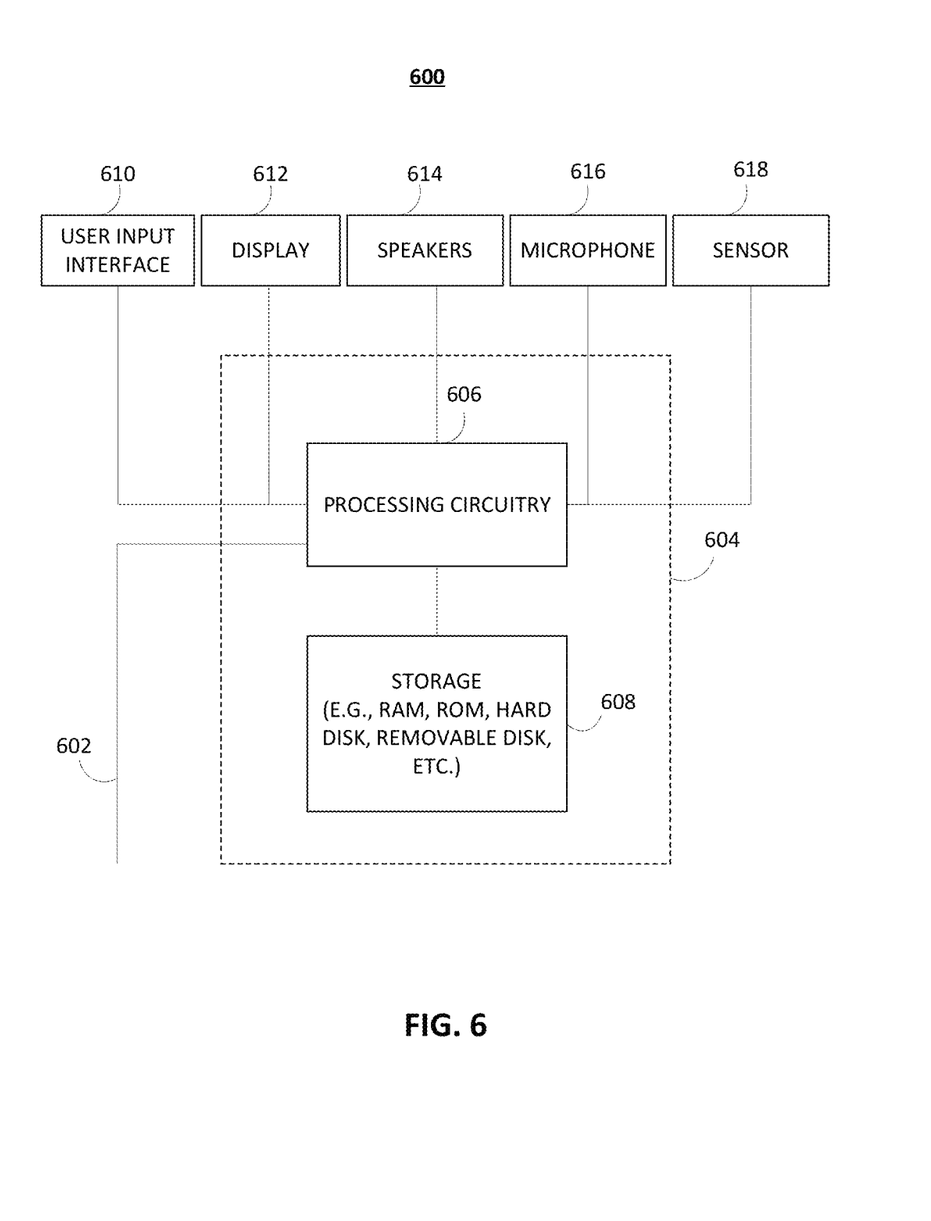
FIG. 6 shows an illustrative block diagram of a user equipment (UE) device system, in accordance with embodiments of the disclosure.

FIGS. 5-6 describe example devices, systems, servers, and related hardware for providing consistent picture quality during streaming of hybrid content. In the system 500, there can be more than one user equipment device 502, but only one is shown in FIG. 5 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 506.

The user equipment devices may be coupled to communications network 506. Namely, the user equipment device 502 is coupled to the communications network 506 via communications path 504. The communications network 506 may be one or more networks including the Internet, a mobile phone network, mobile voice or data network (e.g., a 5G or LTE network), cable network, public switched telephone network, or other types of communications network or combinations of communications networks. The communications network 506 may be connected to a media content source 512 through a second path 508 and may be connected to a server 514 through a third path 510. The paths may separately, or in together with other paths, include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, the paths may be wireless paths. Communications between the devices may be provided by one or more communications paths but is shown as a single path in FIG. 5 to avoid overcomplicating the drawing.

The system 500 also includes media content source 512, and server 514, which can be coupled to any number of databases providing information to the user equipment devices. The media content source 512 represents any computer-accessible source of content, such as a storage for media assets, metadata, or, similar such information. The server 514 may store and execute various software modules to implement the providing of consistent picture quality during streaming of hybrid content functionality. In some embodiments, the user equipment device 502, media content source 512, and server 514 may store metadata associated with a video, audio asset, and/or media item.

FIG. 6 shows a generalized embodiment of a user equipment device 600, in accordance with one embodiment. In an embodiment, the user equipment device 600 is the same user equipment device 502 of FIG. 5. The user equipment device 600 may receive content and data via input/output (I/O) path 602. The I/O path 602 may provide content (e.g., broadcast programming, on-demand programming, Internet content, content available over a local area network (LAN) or wide area network (WAN), and/or other content) and data to control circuitry 604, which includes processing circuitry 606 and a storage 608. The control circuitry 604 may be used to send and receive commands, requests, and other suitable data using the I/O path 602. The I/O path 602 may connect the control circuitry 604 (and specifically the processing circuitry 606) to one or more communications paths. I/O functions may be provided by one or more of these communications paths but are shown as a single path in FIG. 6 to avoid overcomplicating the drawing.

The control circuitry 604 may be based on any suitable processing circuitry such as the processing circuitry 606. As referred to herein, processing circuitry 606 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of consistent picture quality during streaming of hybrid content functionality can be at least partially implemented using the control circuitry 604. The providing of consistent picture quality during streaming of hybrid content functionality described herein may be implemented in or supported by any suitable software, hardware, or combination thereof. The providing of consistent picture quality during streaming of hybrid content functionality can be implemented on the user equipment, on remote servers, or across both.

In client/server-based embodiments, the control circuitry 604 may include communications circuitry suitable for communicating with one or more servers that may at least implement the described providing of consistent picture quality during streaming of hybrid content functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 608 that is part of the control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 608 may be used to store various types of content described herein. Nonvolatile memory may also be used (e.g., to launch a boot-up routine and other instructions). Cloud-based storage, described in relation to FIG. 5, may be used to supplement the storage 608 or instead of the storage 608.

The control circuitry 604 may include audio generating circuitry and tuning circuitry, such as one or more analog tuners, audio generation circuitry, filters or any other suitable tuning or audio circuits or combinations of such circuits. The control circuitry 604 may also include scaler circuitry for upconverting and down converting content into the preferred output format of the user equipment device 600. The control circuitry 604 may also include digital-to-analog converter circuitry and analog-to-digital converter circuitry for converting between digital and analog signals. The tuning and encoding circuitry may be used by the user equipment device 600 to receive, to modify, to display, to play, and/or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 608 is provided as a separate device from the user equipment device 600, the tuning and encoding circuitry (including multiple tuners) may be associated with the storage 608.

The user may utter instructions to the control circuitry 604, which are received by the microphone 616. The microphone 616 may be any microphone (or microphones) capable of detecting human speech. The microphone 616 is connected to the processing circuitry 606 to transmit detected voice commands and other speech thereto for processing.

The user equipment device 600 may optionally include an interface 610. The interface 610 may be any suitable user interface, such as a remote control, mouse, trackball, keypad, keyboard, touchscreen, touchpad, stylus input, joystick, or other user input interfaces. A display 612 may be provided as a stand-alone device or integrated with other elements of the user equipment device 600. For example, the display 612 may be a touchscreen or touch-sensitive display. In such circumstances, the interface 610 may be integrated with or combined with the microphone 616. When the interface 610 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 610 may be HDTV-capable. In some embodiments, the display 612 may be a 3D display.

The speakers 614 may be integrated with other elements of user equipment device 600 or may be one or more stand-alone units. In some embodiments, the speakers 614 may be dynamic speakers, planar magnetic speakers, electrostatic speakers, horn speakers, subwoofers, tweeters, and/or similar such speakers. In some embodiments, the control circuitry 604 outputs one or more audio signals to the speakers 614. In some embodiments, one or more speakers receive and output a unique audio signal. In some embodiments, one or more speakers receive and output the same audio signal. In some embodiments, the speakers 614 change positions and/or orientation.

The user equipment device 600 may optionally include a sensor 618. Although only one sensor 618 is shown, any number of sensors may be used. In some embodiments, the sensor 618 is a camera, depth sensors, Lidar sensor, and/or any similar such sensor. In some embodiments, the sensor 618 (e.g., image sensor(s) or camera(s)) of the user equipment device 600 may capture a scene (e.g., first scene 104).

The user equipment device 600 of FIG. 6 can be implemented in system 500 of FIG. 5 as user equipment device 502, but any other type of user equipment suitable for providing consistent picture quality during streaming of hybrid content may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 7:
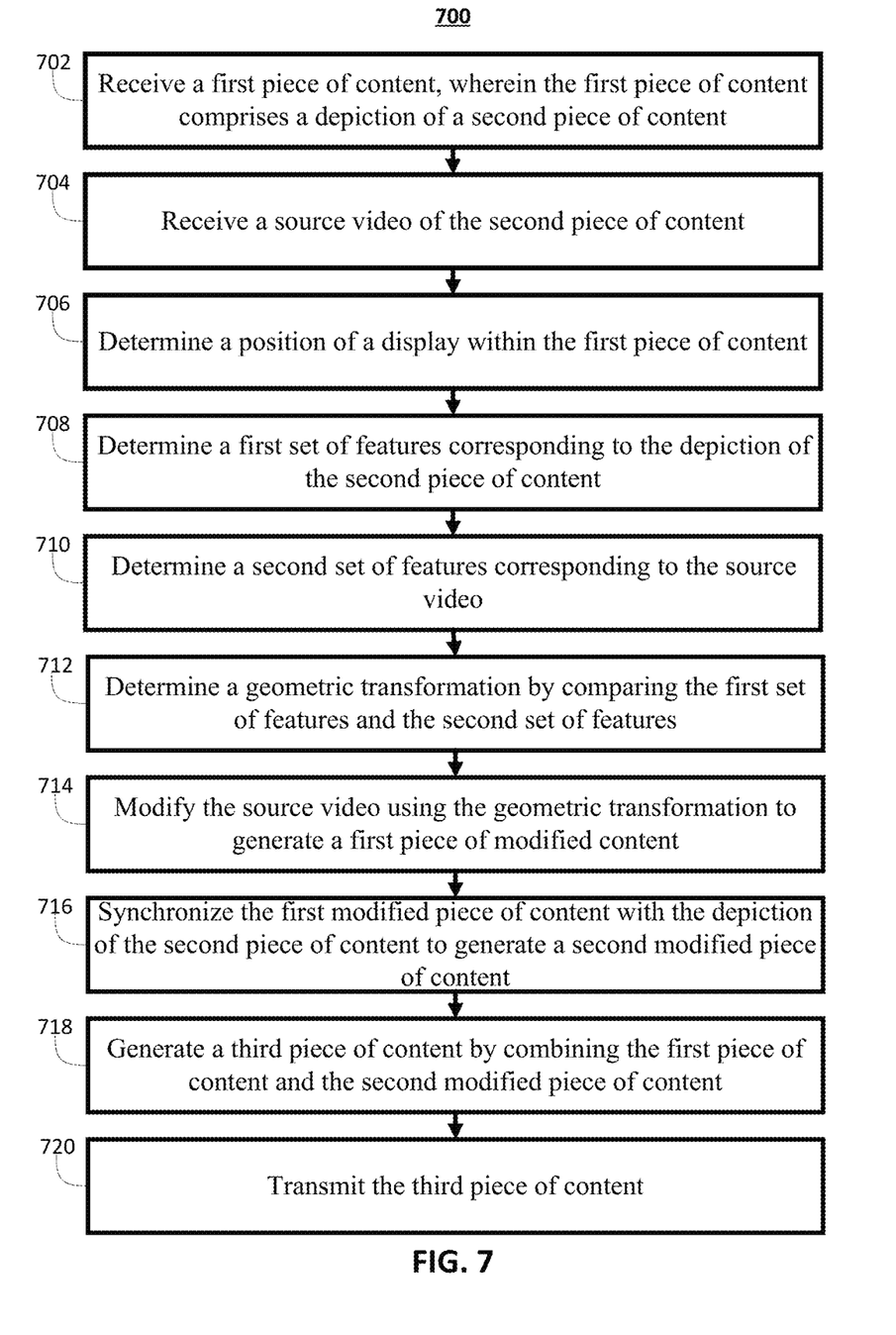
FIG. 7 shows an illustrative flowchart of a process for providing consistent picture quality during streaming of hybrid content, in accordance with embodiments of the disclosure.

FIG. 7 is an illustrative flowchart of a process 700 for providing of consistent picture quality during streaming of hybrid content, in accordance with embodiments of the disclosure. Process 700, and any of the following processes, may be executed by control circuitry 604 on a user equipment device 600. In some embodiments, control circuitry 604 may be part of a remote server separated from the user equipment device 600 by way of a communications network or distributed over a combination of both. In some embodiments, instructions for executing process 700 may be encoded onto a non-transitory storage medium (e.g., the storage 608) as a set of instructions to be decoded and executed by processing circuitry (e.g., the processing circuitry 606). Processing circuitry may, in turn, provide instructions to other sub-circuits contained within control circuitry 604, such as the encoding, decoding, encrypting, decrypting, scaling, analog/digital conversion circuitry, and the like. It should be noted that the following processes, or any step thereof, could be performed on, or provided by, any of the devices shown or described in FIGS. 1-6. Although the following processes are illustrated and described as a sequence of steps, it is contemplated that various embodiments of the following processes may be performed in any order or combination and need not include all the illustrated steps.

At 702, control circuitry receives a first piece of content, wherein the first piece of content comprises a depiction of a second piece of content. In some embodiments, the control circuitry receives the first piece of content from one or more devices. For example, the one or more devices may be a DSLR camera, point-and-shoot camera, bridge camera, and/or camera phone. In some embodiments, the control circuitry receives image and/or audio data from the one or more devices and generates the first piece of content. In some embodiments, the control circuitry is part of the one or more devices capturing the first piece of content. In some embodiments, the first piece of content may comprise one or more real objects (e.g., people, furniture, devices, etc.) and a depiction of a second piece of content. For example, the first piece of content may depict a person (e.g., real object) conducting a virtual interview. The first piece of content may also depict a device displaying a stream of another person being interviewed (e.g., second piece of content). In some embodiments, the control circuitry stores the first piece of content in storage (e.g., storage 608).

At 704, control circuitry receives a source video of the second piece of content. In some embodiments, the control circuitry receives the second piece of content from the source of the second piece of content. For example, a server may transmit the source video of the second piece of content to the control circuitry and also transmit the source video of the second piece of content to a device (e.g., second device 108) displaying the second piece of content depicted in the first piece of content. In some embodiments, the control circuitry receives the second piece of content from the same device that displayed the second piece of content in the scene depicted in the first piece of content. For example, a server may transmit the second piece of content to a device (e.g., second device 108) depicted in the first piece of content. The device depicted in the first piece of content may display the second piece of content and transmit the second piece of content to the control circuitry. In another example, a device (e.g., third device 308) may capture image and/or audio data and then generate the second piece of content. The device may then display the second piece of content and transmit the second piece of content to the control circuitry.

At 706, control circuitry determines a position of a display within the first piece of content. In some embodiments, the control circuitry uses one or more techniques to determine the position of the display within the first piece of content. For example, the control circuitry may use one or more object detection algorithms, corner detection algorithms, edge detection algorithms, and/or user inputs to identify where the display is located within the first piece of content. Although the position of the display is described, the control circuitry may determine the position of the depiction of the second piece of content within the first piece of content. For example, a device (e.g., second device 108) may display the second piece of content using a portion of the device's display. In such an example, the control circuitry may determine the position of the depiction of the second piece of content rather than the position of the depiction of the display. The control circuitry may use any of the techniques described herein to determine the position of the depiction of the second piece of media content within the first piece of media content.

At 708, control circuitry determines a first set of features corresponding to the depiction of the second piece of content. For example, the control circuitry may perform feature extraction on the depiction of the second piece of content to determine a first set of features. At 710, control circuitry determines a second set of features corresponding to the source video. For example, the control circuitry may perform feature extraction on the source video of the second piece of content depicted in the first piece of content to determine a second set of features.

At 712, control circuitry determines a geometric transformation by comparing the first set of features and the second set of features. In some embodiments, the control circuitry performs feature matching to find the geometric transformation. For example, the control circuitry may determine an affine transformation based on the first set of features and the second set of features.

At 714, control circuitry modifies the source video using the geometric transformation to generate a first piece of modified content. For example, the control circuitry may apply an affine transformation, determined at step 712, to the source video. In some embodiments, one or more features associated with the first piece of modified content match one or more features of the first set of features corresponding to the depiction of the second piece of content. In some embodiments, all the features associated with the first piece of modified content match the first set of features corresponding to the depiction of the second piece of content. In some embodiments, the control circuitry also crops the source video and/or changes the aspect ratio of the source video to generate the first piece of modified content. For example, the depiction of the second piece of content may have a first aspect ratio, and the source video may have a second aspect ratio. The control circuitry may modify the second aspect ratio of the source video to generate the first piece of modified content, where the aspect ration of the first piece of modified content is the same as or similar to the first aspect ratio associated with the depiction of the second piece of content. In another example, the depiction of the second piece of content may be cropped relative to the source video. The control circuitry may modify the source video to generate the first piece of modified content, where the first piece of modified content is cropped to have the same or similar dimensions as the depiction of the second piece of content.

At 716, control circuitry synchronizes the first modified piece of content with the depiction of the second piece of content to generate a second modified piece of content. In some embodiments, the control circuitry changes the playback speed, frame rate, and/or playback point of the first piece of modified content to match the playback speed, frame rate, and/or playback point of the depiction of the second piece of content. The control circuitry may synchronize the first piece of modified content with the depiction of the second piece of content using video synchronization and/or audio synchronization. For example, the control circuitry may match one or more frames from the depiction of the second piece of content with one or more frames from the first piece of modified content. In another example, the control circuitry may match a portion of a first audio signal associated with the depiction of the second piece of content with a portion of a second audio signal associated with the first piece of modified content. In some embodiments, the control circuitry uses image recognition applications, frequency comparison applications, optical flow estimation, one or more machine learning algorithms and/or similar such methodologies to synchronize the first modified piece of content with the depiction of the second piece of content.

In some embodiments, the control circuitry modifies the first modified piece of content to generate a second modified piece of content. For example, the depiction of the second piece of content may show only a portion of a video clip, and the control circuitry may modify the first modified piece of content based on the second piece of content showing only the portion of the video clip. The control circuitry may trim the first modified piece of content to generate a second modified piece of content having a playback length matching the playback length of the depiction of the second piece of content and a starting playback point matching the starting playback point of the depiction of the second piece of content. In some embodiments, the playback speed, frame rate, and/or playback point of the second piece of modified content matches the playback speed, frame rate, and/or playback point of the depiction of the second piece of content.

As described above, the steps of process 700 may be performed in any order or combination. For example, the control circuitry may perform feature extraction after the control circuitry synchronizes the source video of the second piece of content with the depiction of the second piece of content. In some embodiments, the control circuitry performs feature extraction on the depiction of the second piece of content to identify the first set of features. The control circuitry may also perform feature extraction on a modified piece of content (e.g., the source video of the second piece of content modified to have a playback length matching the playback length of the depiction of the second piece of content and a starting playback point matching the starting playback point of the depiction of the second piece of content) to identify a third set of features. The control circuitry may then perform feature matching using the first set of features and the third set of features to determine a geometric transformation between the modified piece of content and the depiction of the second piece of content. In some embodiments, synchronizing the source video of the second piece of content with the depiction of the second piece of content before determining the geometric transformation results in a more precise geometric transformation.

At 718, control circuitry generates a third piece of content by combining the first piece of content and the second modified piece of content. In some embodiments, the control circuitry generates the third piece of content by replacing the depiction of the second piece of content with the second modified piece of content. For example, the control circuitry may remove any data (e.g., depiction of the second piece of content) located within the determined position of the depiction of the display in the first piece of content and insert the second modified piece of content. In some embodiments, the control circuitry uses one or more techniques to blend the inserted second modified piece of content with the first piece of content. For example, the control circuitry may use image blending and/or compositing techniques when merging the second modified piece of content with the first piece of content. In another example, the control circuitry may use tone mapping and/or color transformations when merging the second modified piece of content with the first piece of content. In another example, the control circuitry may use one or more video filters when merging the second modified piece of content with the first piece of content.

At 720, control circuitry transmits the third piece of content. In some embodiments, the control circuitry transmits the third piece of content to one or more devices. For example, the control circuitry may broadcast and/or stream the third piece of content to one or more user devices. In another example, the control circuitry may transmit the third piece of content to one or more servers. In some embodiments, the control circuitry uses one or more communications networks (e.g., communications network 506) to transmit the third piece of content.

It is contemplated that some suitable steps or suitable descriptions of FIG. 7 may be used with other suitable embodiments of this disclosure. In addition, some suitable steps and descriptions described in relation to FIG. 7 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-6 could be used to perform one or more of the steps in FIG. 7.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating a first piece of content, wherein the first piece of content comprises a depiction of a second piece of content being displayed on a display;

receiving a source video of the second piece of content;
determining a position of the display within the first piece of content;
determining a first set of features corresponding to the depiction of the second piece of content displayed within the first piece of content;
determining a second set of features corresponding to the source video;
determining a geometric transformation by comparing the first set of features corresponding to the depiction of the second piece of content and the second set of features corresponding to the source video;
modifying the source video using the geometric transformation to generate a first modified piece of content;
synchronizing the first modified piece of content with the depiction of the second piece of content displayed within the first piece of content to generate a second modified piece of content;
generating a third piece of content by combining the first piece of content and the second modified piece of content, wherein the second modified piece of content is inserted into the position of the display within the first piece of content replacing the depiction of the second piece of content; and
transmitting the third piece of content to one or more devices.

2. The method of claim 1, wherein the first piece of content is generated by capturing a first scene comprising the display displaying the second piece of content.

3. The method of claim 1, wherein determining the position of the display comprises detecting the display within the first piece of content using an object detection algorithm.

4. The method of claim 1, wherein determining the position of the display comprises detecting the display within the first piece of content using corner and/or edge detection.

5. The method of claim 1, wherein determining the position of the display comprises receiving a first input, where the first input indicates the position of the display.

6. The method of claim 1, wherein the geometric transformation is an affine transformation.

7. The method of claim 1, further comprising cropping the second modified piece of content in response to comparing the first set of features corresponding to the depiction of the second piece of content and the second set of features corresponding to the source video.

8. The method of claim 1, further comprising:
identifying a first set of frames from the depiction of the second piece of content displayed within the first piece of content;
identifying a second set of frames from the first modified piece of content;
matching one or more frames of the first set of frames with one or more frames of the second set of frames; and
synchronizing the first modified piece of content with the depiction of the second piece of content displayed within the first piece of content using the matched one or more frames of the first set of frames to generate the second modified piece of content.

9. The method of claim 1, further comprising:
identifying a first audio signal associated with the depiction of the second piece of content displayed within the first piece of content;
identifying a second audio signal associated with the first modified piece of content;
matching a portion of the first audio signal with a portion of the second audio signal; and
synchronizing the first modified piece of content with the depiction of the second piece of content displayed within the first piece of content using the matched portion of the first audio signal to generate the second modified piece of content.

10. The method of claim 1, wherein a first device comprises the display, and the source video of the second piece of content is received from the first device.

11. An apparatus, comprising:
control circuitry; and
at least one memory including computer program code for one or more programs, the at least one memory and the computer program code configured to, with the control circuitry, cause the apparatus to perform at least the following:
generate a first piece of content, wherein the first piece of content comprises a depiction of a second piece of content being displayed on a display;
receive a source video of the second piece of content;
determine a position of the display within the first piece of content;
determine a first set of features corresponding to the depiction of the second piece of content displayed within the first piece of content;
determine a second set of features corresponding to the source video;
determine a geometric transformation by comparing the first set of features corresponding to the depiction of the second piece of content and the second set of features corresponding to the source video;
modify the source video using the geometric transformation to generate a first modified piece of content;
synchronize the first modified piece of content with the depiction of the second piece of content displayed within the first piece of content to generate a second modified piece of content;
generate a third piece of content by combining the first piece of content and the second modified piece of content, wherein the second modified piece of content is inserted into the position of the display within the first piece of content replacing the depiction of the second piece of content; and
transmit the third piece of content to one or more devices.

12. The apparatus of claim 11, wherein the first piece of content is generated by capturing a first scene comprising the display displaying the second piece of content.

13. The apparatus of claim 11, wherein the apparatus is further caused, when determining the position of the display, to detect the display within the first piece of content using an object detection algorithm.

14. The apparatus of claim 11, wherein the apparatus is further caused, when determining the position of the display, to detect the display within the first piece of content using corner and/or edge detection.

15. The apparatus of claim 11, wherein the apparatus is further caused, when determining the position of the display, to receive a first input, where the first input indicates the position of the display.

16. The apparatus of claim 11, wherein the geometric transformation is an affine transformation.

17. The apparatus of claim 11, wherein the apparatus is further caused to crop the second modified piece of content in response to comparing the first set of features corresponding to the depiction of the second piece of content and the second set of features corresponding to the source video.

18. The apparatus of claim 11, wherein the apparatus is further caused to:
- identify a first set of frames from the depiction of the second piece of content displayed within the first piece of content;
- identify a second set of frames from the first modified piece of content;
- match one or more frames of the first set of frames with one or more frames of the second set of frames; and
- synchronize the first modified piece of content with the depiction of the second piece of content displayed within the first piece of content using the matched one or more frames of the first set of frames to generate the second modified piece of content.

19. The apparatus of claim 11, wherein the apparatus is further caused to:
- identify a first audio signal associated with the depiction of the second piece of content displayed within the first piece of content;
- identify a second audio signal associated with the first modified piece of content;
- match a portion of the first audio signal with a portion of the second audio signal; and
- synchronize the first modified piece of content with the depiction of the second piece of content displayed within the first piece of content using the matched portion of the first audio signal to generate the second modified piece of content.

20. A non-transitory computer-readable medium having instructions encoded thereon that, when executed by control circuitry, cause the control circuitry to:
- generate a first piece of content, wherein the first piece of content comprises a depiction of a second piece of content being displayed on a display;
- receive a source video of the second piece of content;
- determine a position of the display within the first piece of content;
- determine a first set of features corresponding to the depiction of the second piece of content displayed within the first piece of content;
- determine a second set of features corresponding to the source video;
- determine a geometric transformation by comparing the first set of features corresponding to the depiction of the second piece of content and the second set of features corresponding to the source video;
- modify the source video using the geometric transformation to generate a first modified piece of content;
- synchronize the first modified piece of content with the depiction of the second piece of content displayed within the first piece of content to generate a second modified piece of content;
- generate a third piece of content by combining the first piece of content and the second modified piece of content, wherein the second modified piece of content is inserted into the position of the display within the first piece of content replacing the depiction of the second piece of content; and
- transmit the third piece of content to one or more devices.

\* \* \* \* \*